US012799789B2

(12) United States Patent
Gaebel

(10) Patent No.: US 12,799,789 B2
(45) Date of Patent: Nov. 17, 2026

(54) GRAVITY HINGE SYSTEM FOR USE WITH GLASS DOORS

(71) Applicant: C.R. Laurence Co., Inc., Los Angeles, CA (US)

(72) Inventor: Marco Gaebel, Ventura, CA (US)

(73) Assignee: C.R. LAURENCE CO., LTD., Los Angeles, CA (US)

( * ) Notice: Subject to any disclaimer, the term of this patent is extended or adjusted under 35 U.S.C. 154(b) by 114 days.

(21) Appl. No.: 19/040,777

(22) Filed: Jan. 29, 2025

(65) Prior Publication Data

US 2025/0389146 A1 Dec. 25, 2025

Related U.S. Application Data

(63) Continuation of application No. 18/752,593, filed on Jun. 24, 2024, now Pat. No. 12,241,298.

(51) Int. Cl.
*E05F 1/06* (2006.01)
*E05D 7/00* (2006.01)

(52) U.S. Cl.
CPC .............. *E05F 1/06* (2013.01); *E05D 7/0018* (2013.01); *E05D 7/0027* (2013.01); *E05F 1/061* (2013.01); *E05Y 2900/132* (2013.01)

(58) Field of Classification Search
CPC ... E05F 1/06; E05F 1/061; E05F 1/063; E05F 1/065; E05F 1/066; E05D 7/0027; E05D 7/0009; E05D 7/0018; E05D 7/0045; E05D 7/0415; E05D 7/0423; E05D 2005/0461; E05D 5/0246; E05D 2005/0253; E05D 2005/0261; E05D 2005/0269; E05D 7/04; E05D 7/043; E05D 2007/0438; E05D 2007/0446; E05D 2007/0453; E05D 2007/0461; E05D 2007/0469; E05D 2007/0484; E05D 7/08; E05D 7/081; E05Y 2900/114
USPC .................................................... 16/252, 253
See application file for complete search history.

(56) References Cited

U.S. PATENT DOCUMENTS

| | | | | | |
|---|---|---|---|---|---|
| 113,788 | A * | 4/1871 | Norton | E05F 1/063 | 16/318 |
| 842,520 | A * | 1/1907 | Brothers | E05D 7/0423 | 16/241 |
| 1,318,824 | A | 10/1919 | Alary | | |
| 1,386,621 | A * | 8/1921 | Hughes | E05F 1/065 | 16/284 |
| 1,446,449 | A * | 2/1923 | Carpenter | E05F 1/065 | 16/315 |
| 1,608,299 | A * | 11/1926 | Carpenter et al. | E05F 1/065 | 16/315 |

(Continued)

FOREIGN PATENT DOCUMENTS

| | | | |
|---|---|---|---|
| EP | 230486 | A1 | 1/1986 |
| KR | 10495147 | B1 | 2/2023 |

*Primary Examiner* — Jeffrey O'Brien
(74) *Attorney, Agent, or Firm* — Cislo & Thomas LLP

(57) ABSTRACT

A hinge system for use with frameless glass shower doors is presented. The hinge system is self-closing or self-centering and includes angular adjustability in two planes to aid in door alignment. The door hinge system further includes drop-in pivot pins which aid in shower door installation and also includes adapter plates that allow for installation to glass walls and further includes adapter plates that allow door panels equipped with the hinge system to be installed as fixed panels at various angles.

5 Claims, 16 Drawing Sheets

(56) References Cited

U.S. PATENT DOCUMENTS 3,059,270 A * 10/1962 Schooler ................. E05F 1/065
16/313
3,107,758 A 10/1963 Benham
3,113,649 A * 12/1963 Wargo ..................... E05F 1/063
16/312
3,160,913 A * 12/1964 Carey ..................... E05F 1/068
16/315
3,191,214 A 6/1965 Protzman
3,222,806 A * 12/1965 Martin .................... E06B 11/04
49/237
3,263,365 A * 8/1966 Eckel .................... E05F 1/1223
16/314
3,289,244 A * 12/1966 Carey ....................... E05F 1/06
16/315
3,325,942 A 6/1967 Bejarano
3,367,613 A * 2/1968 Christensen ....... A47G 29/1216
248/145
3,378,881 A * 4/1968 Joffre ...................... E05F 1/063
16/312
3,398,487 A * 8/1968 Matyas ..................... E06B 3/72
16/312
3,401,422 A * 9/1968 Ventura ................... E05F 1/061
16/54
3,518,716 A * 7/1970 Larson .................. E05F 1/1223
16/284
3,546,736 A * 12/1970 Booth ..................... E05F 1/063
16/312
3,628,845 A * 12/1971 Grimm ................... E05F 1/063
16/312
3,648,327 A 3/1972 Edeus
3,653,156 A 4/1972 Horgan
3,722,031 A 3/1973 Bourgeois
3,828,394 A * 8/1974 Horgan, Jr. ........... E05D 5/0246
16/241
3,858,274 A 1/1975 Burton
3,964,207 A 6/1976 Peterson
4,090,274 A * 5/1978 Bourgeois ............... E05F 1/063
16/317
4,523,414 A 6/1985 Horgan
4,774,740 A * 10/1988 Gidseg .................. F25D 23/028
16/351
4,956,954 A 9/1990 Horgan
5,138,743 A * 8/1992 Hoffman ............... E05F 1/1223
16/303
5,265,311 A * 11/1993 Gard ......................... E05F 1/06
16/311
5,283,978 A 2/1994 Horgan
5,367,745 A * 11/1994 Roloff ................... E05F 1/1223
16/312
5,369,842 A * 12/1994 Beatty ................... F25D 23/028
16/317
5,448,799 A * 9/1995 Stein, Jr. ................. E05D 11/00
16/225
5,500,984 A 3/1996 Lee
5,613,276 A 3/1997 Franz
5,867,869 A * 2/1999 Garrett .................... E05D 15/54
16/334
6,161,255 A 12/2000 Garrett
6,434,791 B1 * 8/2002 Chung .................. E05D 7/0423
16/389
6,643,898 B1 11/2003 Cameron
6,704,966 B1 * 3/2004 Kao .................... E05D 11/1064
16/334
6,757,938 B1 * 7/2004 di Vinadio ........... E05D 7/0054
16/245
6,826,870 B2 * 12/2004 Chiang ................. E05D 5/0246
49/388
6,928,699 B2 8/2005 Sawa
6,990,772 B2 1/2006 Eckel
7,111,361 B2 * 9/2006 Li ....................... H04M 1/0216
16/284
7,114,292 B2 * 10/2006 Chiang ................. E05D 5/0246
16/252
7,127,777 B2 10/2006 Chiang
7,188,390 B2 * 3/2007 Cheng ................... E05D 7/0415
16/241
7,346,959 B2 * 3/2008 Heid ..................... E05D 7/0423
16/245
7,555,815 B2 7/2009 Tate
8,365,357 B2 * 2/2013 Huang ................ H04M 1/0216
16/303
8,432,677 B2 4/2013 Duan
8,495,795 B2 * 7/2013 Christie .............. E05D 11/1078
16/315
8,510,913 B2 8/2013 Kim
8,533,909 B2 * 9/2013 Minegishi ............. E05F 1/1215
16/72
8,544,150 B2 * 10/2013 Christie .............. E05D 11/1078
16/315
8,578,557 B2 11/2013 Yu
8,701,248 B2 * 4/2014 Dries ........................ E05D 5/10
49/245
8,776,436 B2 7/2014 Miller
8,789,240 B2 7/2014 Bouwman
9,395,089 B2 * 7/2016 Nelson .................... E05D 7/043
9,644,410 B2 * 5/2017 Hayes ....................... E05D 3/02
9,687,087 B1 6/2017 Artwohl
9,834,967 B2 * 12/2017 Johnson .................. E05D 5/128
9,903,638 B2 2/2018 Dubina
10,060,168 B2 * 8/2018 Corpuz, Jr. ............. E05D 7/081
10,072,450 B2 * 9/2018 Lambertini ........... E05D 7/0415
10,246,917 B2 * 4/2019 Ginter ....................... E05D 3/08
10,392,846 B2 8/2019 Sprague
10,480,230 B2 * 11/2019 Brun ......................... E05D 5/12
10,697,218 B2 6/2020 Frielingsdorf
10,704,309 B2 7/2020 Sprague
11,180,938 B2 11/2021 Sakuma
12,241,298 B1 * 3/2025 Gaebel ...................... E05F 1/06
2002/0116788 A1 * 8/2002 Pompei ................... E05F 1/063
16/315
2004/0020130 A1 2/2004 Chiang
2004/0111835 A1 * 6/2004 Elmer ................... E05D 7/0027
16/221
2005/0011046 A1 1/2005 Dionysian
2005/0193522 A1 9/2005 Jackson
2006/0242792 A1 * 11/2006 Kienle ................ E05D 11/1078
16/252
2007/0169413 A1 7/2007 Miller
2007/0193118 A1 8/2007 Miller
2008/0168621 A1 * 7/2008 Lin ..................... E05D 11/1064
16/252
2008/0307606 A1 * 12/2008 Karlsson ............... E05D 7/0423
16/245
2010/0043293 A1 2/2010 Nicholson
2011/0203046 A1 8/2011 Donnelly et al.
2011/0232036 A1 9/2011 Dries
2013/0154464 A1 * 6/2013 Fiori ..................... E05D 7/0423
16/303
2016/0153220 A1 6/2016 Hu
2017/0146282 A1 * 5/2017 Dodge ...................... E05D 3/02
2017/0167173 A1 6/2017 Johnson
2017/0226787 A1 8/2017 Sprague
2018/0002958 A1 * 1/2018 Mironchuk ............. E05D 7/081
2025/0271010 A1 * 8/2025 Gaebel ..................... A47K 3/30

* cited by examiner

GRAVITY HINGE SYSTEM FOR USE WITH GLASS DOORS

CROSS-REFERENCE TO RELATED APPLICATION

This application claims priority as a continuation of U.S. patent application Ser. No. 18/752,593 entitled "Gravity Hinge System for Use with Glass Doors," filed on Jun. 24, 2024, which is incorporated herein, in its entirety, by this reference.

FIELD OF THE INVENTION

The present invention relates generally to the art of hinges for use with panel doors where a self-closing action is desired. More particularly, the invention relates to a self-closing panel door where a gravity hinge provides the self-closing action. Such hinges are commonly used with glass doors in shower enclosures.

BACKGROUND OF THE INVENTION

Shower enclosure design has achieved a significant level of importance in the overall appearance of a home. Architects and homeowners today are insisting that every detail of a shower enclosure be precise and decorative in nature. Modern shower enclosures are often fabricated almost entirely from glass panels. Unfortunately, when it comes to glass shower doors, suitable door hinges which feature a much desired self-closing action are generally not in conformance with the otherwise highly decorative theme of modern shower enclosures. Prior art shower door hinges are often bulky and unsightly devices that are decidedly not decorative in nature.

Most shower doors presently available are constructed as a translucent plastic or glass panel surrounded by a metal frame and are of the swinging door type. Such doors usually are affixed to the shower enclosure at the pivoted edge of the door using piano style hinges which often extend the full height of the door. Prior art hinges typically connect the metal frame of the door to the shower enclosure doorjamb and are bolted to the doorjamb in several places as is required to adequately support the weight of the door. In a typical installation, the free edge of the door swings against a vertical metal strike plate which is bolted to the doorjamb on an inboard side of the enclosure. The strike plate serves as a positive stop to the door's travel. A spring-biased latch is also often used in conjunction with the strike plate to keep the door in the closed position.

Traditional methods of affixing a shower door to an enclosure as described above have proven to be undesirable in modern high-end shower enclosures. Modern high-end shower enclosures typically feature a frameless glass door panel set into a glass enclosure. In this style of installation, it is desirable to polish the vertical and horizontal edges of the glass door and leave the edges unframed to create the appearance of an unbroken glass wall.

Piano style hinges and most other prior art shower door hinges are poorly suited to a glass panel door because the glass door lacks vertical frame rails and the glass wall lacks a doorjamb structure. While it may be possible to install the piano style hinges and the strike plate directly to the glass door and associated glass wall structure, any such installation would be unsightly and unacceptable to both architects and consumers.

What is needed therefore, is an alternative to the traditional piano style door hinge specifically designed to work with glass doors installed in glass shower enclosures. Any such hinge system should be sufficiently compact so as not to overly intrude on the glass door panel to provide for the appearance of an unbroken glass wall. It is further desirable that the hinges incorporate a self-closing feature to eliminate the need for a strike plate and latch on the free end and include adjustment and installation features that reduce the labor needed to install a glass panel shower door.

SUMMARY OF THE INVENTION

The present invention solves the problems of the prior art by providing a compact, door hinge system suitable for use with a frameless door panel and, in particular, a glass door panel. The hinge system is self-centering or self-closing and includes angular and translational door to doorjamb alignment features, as well as features that simplify door installation.

The door hinge system of the present invention includes an upper hinge and a lower hinge. The lower hinge is a gravity style hinge that provides for self-centering or self-closing action of the door. The lower hinge includes a lower fixed or lower inboard hinge bracket that mounts to a doorjamb or other door support structure, a lower movable or lower outboard hinge bracket that interfaces with a glass panel and a lower clamp plate that secures the glass panel to the lower movable hinge bracket. The lower fixed hinge bracket and lower movable hinge bracket are interconnected by means of a lower pivot pin.

The lower pivot pin is mounted coincident with the pivot axis of the hinge in the lower movable hinge bracket and includes a generally u-shaped, ramped socket at a lower end. The u-shaped socket interfaces with an engagement pin mounted horizontally in the lower fixed hinge bracket.

With the door hinge system of the present invention installed on a rectangular glass door installed in a shower enclosure, in the closed or "at-rest" position, the shower door is positioned such that its long sides are perpendicular to a sill or a floor surface and the door's short sides are parallel to the sill or floor surface. In this at-rest or closed position, the door is defined as being at zero degrees of rotation.

The u-shaped socket 34 of the lower pivot pin 30 allows the door panel 16 to open about 180 degrees inwardly, i.e. into the shower enclosure and to about 180 degrees outwardly, i.e. exterior of the shower enclosure. After approximately 75 degrees of rotation, either inwardly or outwardly, the door panel 16 will remain stationary when released. At approximately 75 degrees or less of rotation, either inwardly or outwardly, when released, the door panel will close or self-center as the weight of the door panel and the upper and lower movable hinge brackets causes the ramped surface 38 of the u-shaped socket 34 of the pivot pin 30 to ride downwardly over the engagement pin 36 until the pin is centered in the u-shaped socket 34, which corresponds to zero degrees of rotation or the at-rest position of the hinges and door panel.

To account for small amounts of angular misalignment between the lower fixed hinge bracket and a sill or post, in a plane parallel to the floor, the lower hinge includes a first angular alignment feature. The first angular alignment feature comprises a longitudinally oriented slot formed along the outer cylindrical surface of the lower pivot pin and a horizontally disposed positioner which features a disc which engages with the slot of the lower pivot pin. The positioner is threaded at one end and engages with a threaded portion of the lower movable hinge bracket. Adjusting the positioner inwardly or outwardly causes the lower pivot pin and u-shaped socket formed integrally therewith to rotate about the pivot axis and thereby allows the lower short side of the door to be angularly aligned with a sill or other portion of a shower floor or enclosure.

To account for small amounts of angular misalignment between the lower fixed hinge bracket and a sill or post, in a plane perpendicular to the floor, the lower hinge includes a second angular alignment feature. The second angular alignment feature comprises a through-hole in the glass door panel into which is disposed a hollow, cylindrical bushing made from a deformable material. The bushing is configured to be a slip fit with the through-hole. The combination of the deformability of the bushing and clearance between the outside diameter of the bushing and the inside diameter of the through-hole provides for the ability to angularly align the glass door panel in a plane perpendicular to the floor or sill.

The upper hinge of the door hinge system of the present invention includes an upper fixed or upper inboard hinge bracket that mounts to a doorjamb or other door support structure, an upper movable or upper outboard hinge bracket that interfaces with the glass panel and an upper clamp plate that secures the glass panel to the upper movable hinge bracket. The upper fixed hinge bracket and upper movable hinge bracket are interconnected by means of an upper pivot pin.

The upper fixed hinge bracket is configured to receive the upper pivot pin. The upper pivot pin is disposed in a bore in the upper fixed hinge bracket and is located or indexes in the bore by means of a shoulder at an upper end of the pin that rests upon a radial stop surface or pocket in the upper fixed hinge bracket. A retainer interfaces with the upper pivot pin and the upper fixed hinge bracket to secure the upper pivot pin in the bore. The upper pivot pin interfaces with a bushing disposed in the upper movable hinge bracket.

Both the upper fixed hinge bracket and the lower fixed hinge bracket feature water seals to prevent water extrusion between each fixed hinge bracket and its respective movable hinge bracket. The seals are retained in the fixed hinge brackets by means of dovetail grooves formed in the brackets and dovetails formed on the seals.

The door hinge system of the present invention also includes adapter plates that allow panels fitted with the hinges to be interconnected at 135 and 180 degree angles where the adapter plates, in addition to interconnecting the hinges also block their operation. At such interconnections, the glass doors function as stationary panels rather than as swinging doors. An adapter plate is also included to allow for doors fitted with the hinge system of the present invention to be connected to a glass wall at a 90 degree angle.

The above and other advantages of the hinge system for use with glass doors of the present invention will be described in more detail below.

DETAILED DESCRIPTION OF THE PREFERRED EMBODIMENTS

Figure 1:
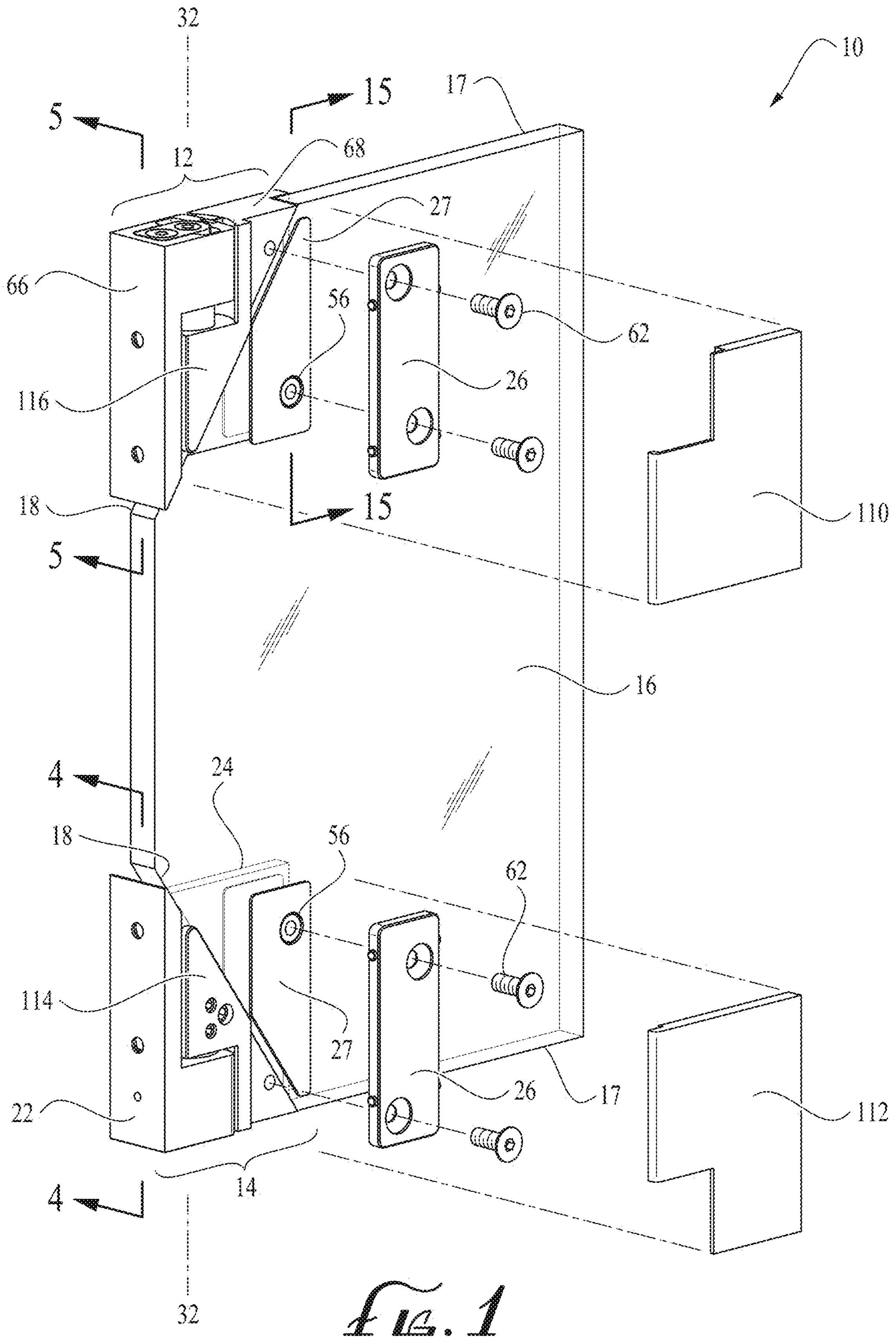
FIG. 1 is a perspective view of the door hinge system of the present invention showing the upper and lower hinges of the system installed on a door panel.
Figure 2:
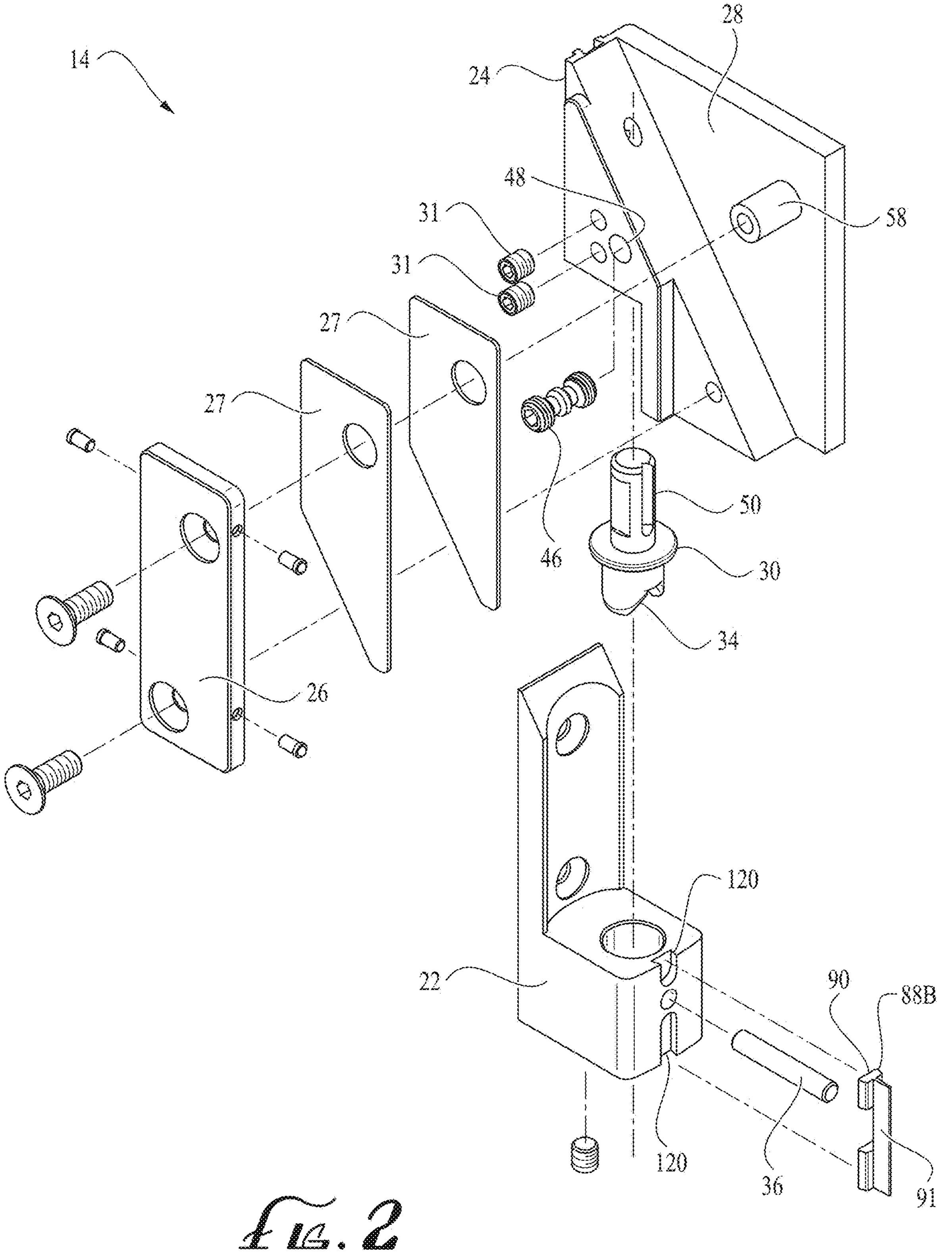
FIG. 2 is an exploded perspective view of the lower hinge of the door hinge system of FIG. 1.
Figure 3:
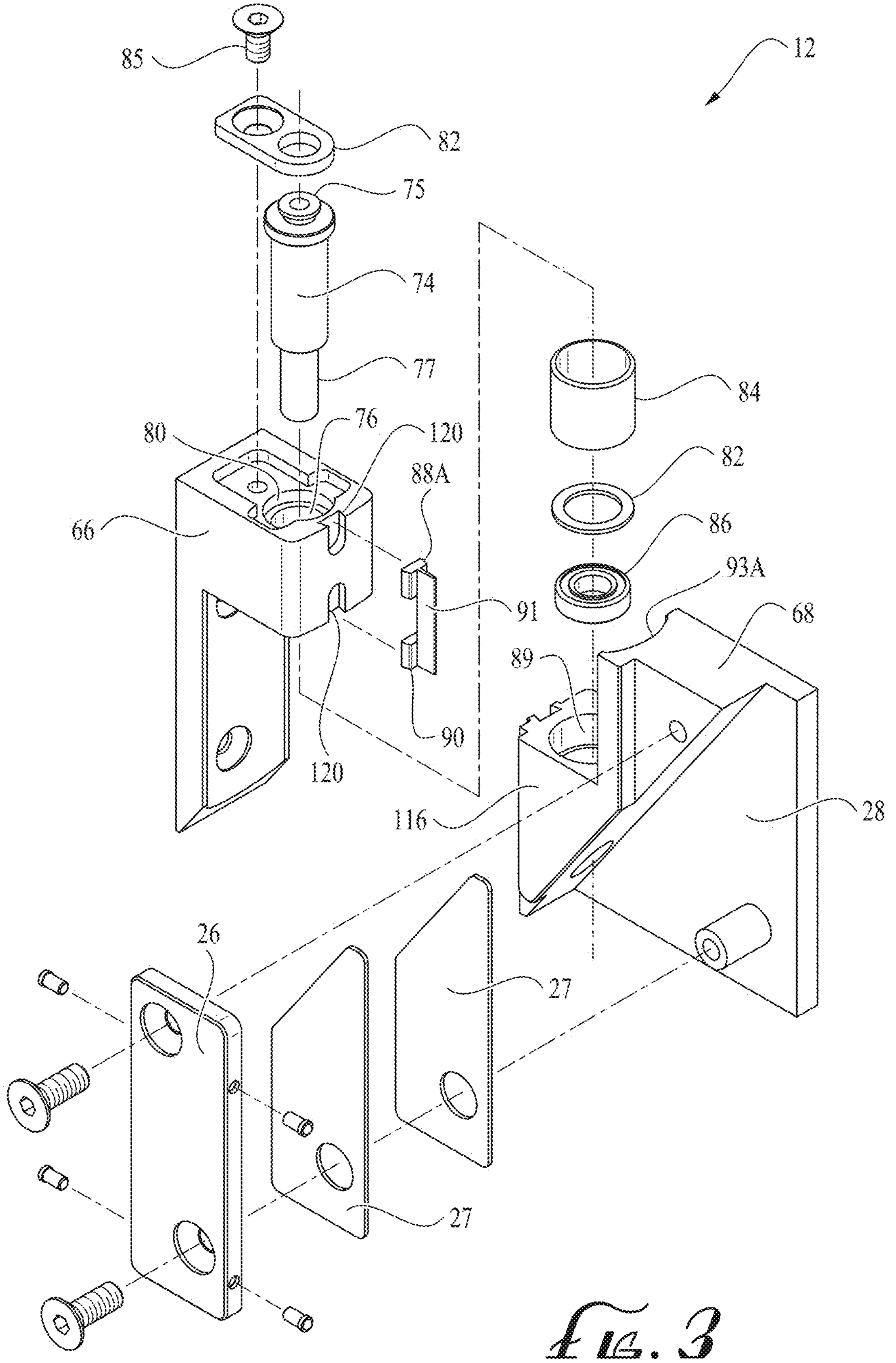
FIG. 3 is an exploded perspective view of the upper hinge of the door hinge system of FIG. 1.
Figure 4:
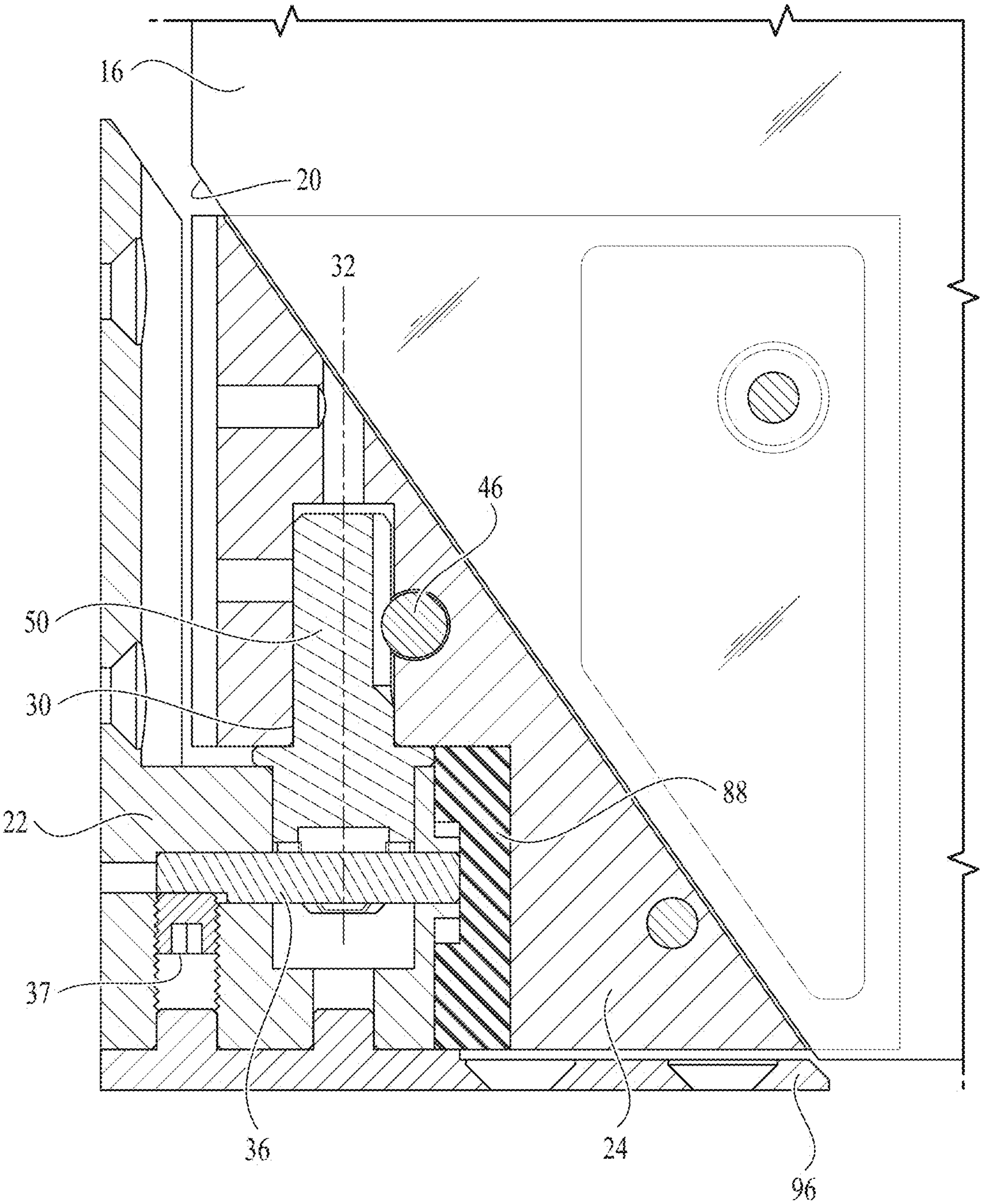
FIG. 4 is a cross-sectional view of the lower hinge taken along the line 4-4 of FIG. 1.
Figure 5:
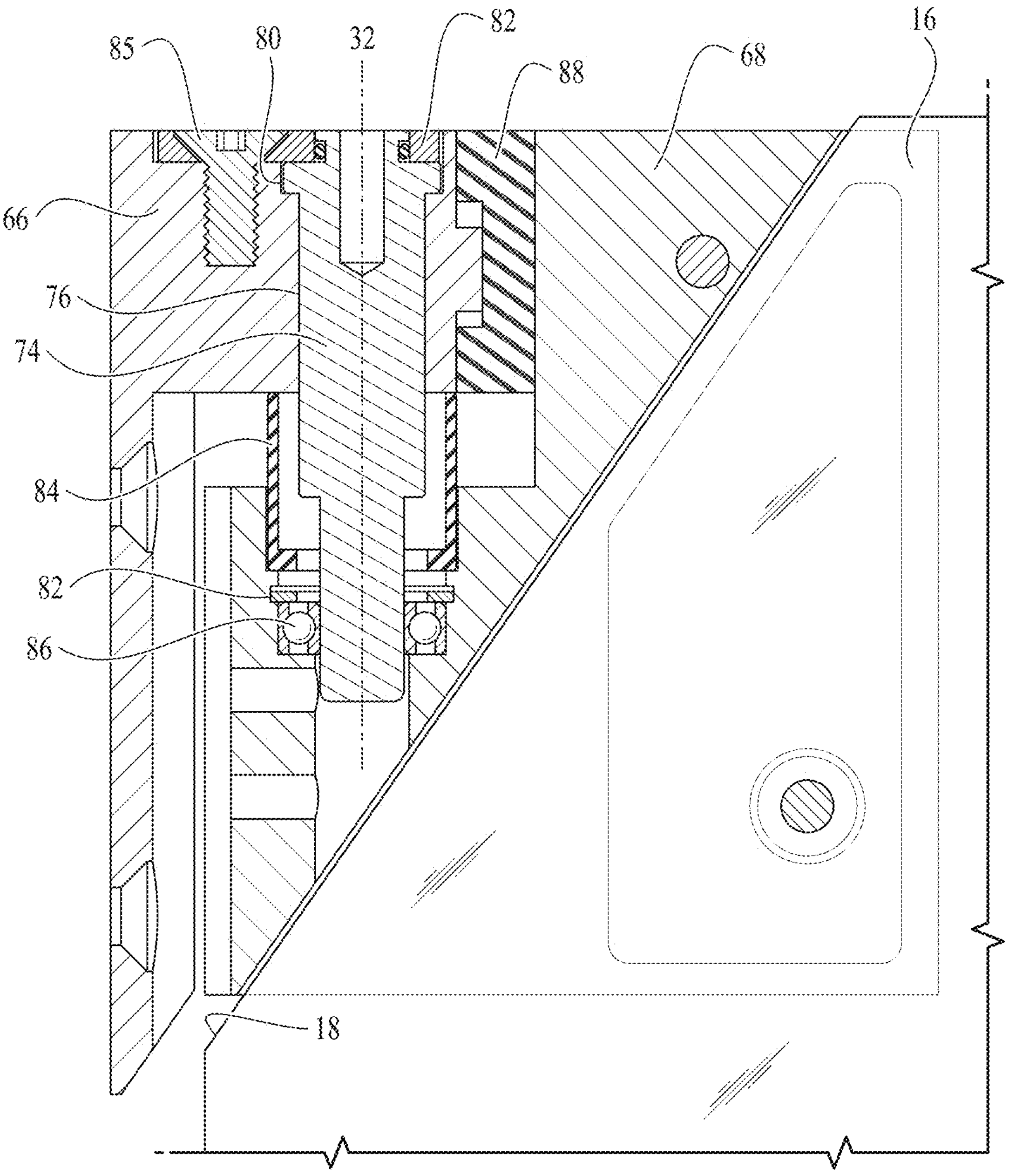
FIG. 5 is a cross-sectional view of the upper hinge taken along the line 5-5 of FIG. 1.
Figure 6:
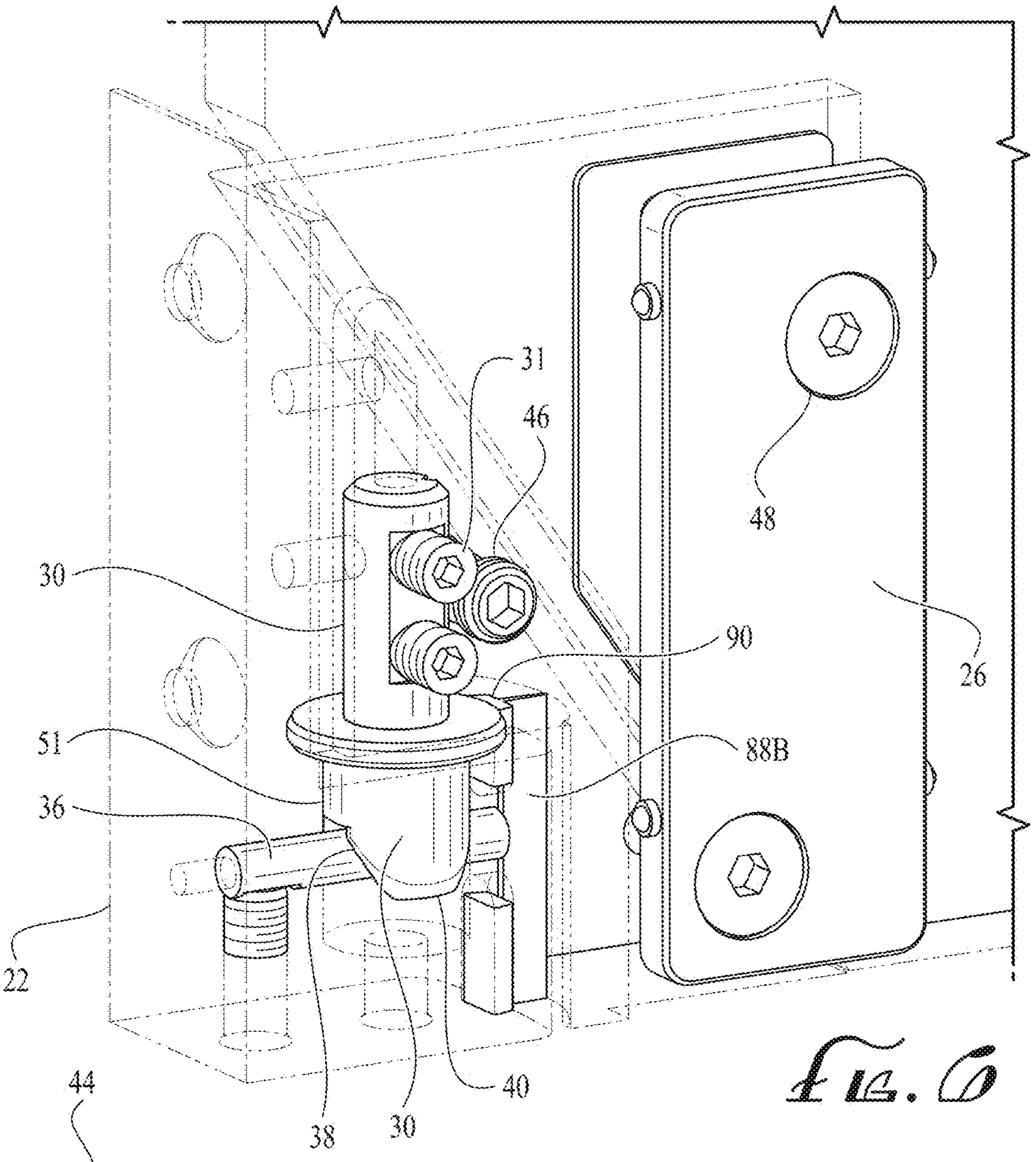
FIG. 6 is a right facing perspective view of the lower hinge of the door hinge system of FIG. 1, with the hinge brackets shown in phantom line to illustrate internal components of the lower hinge.
Figure 7:
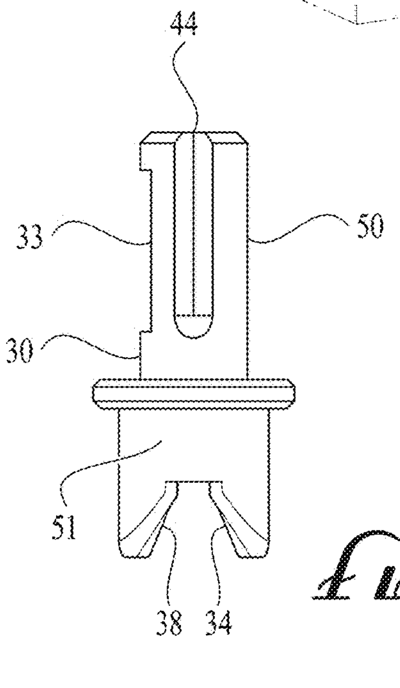
FIG. 7 is a front view of the lower hinge pin used in the door hinge system of FIG. 1 and illustrated in FIG. 6.
Figure 8:
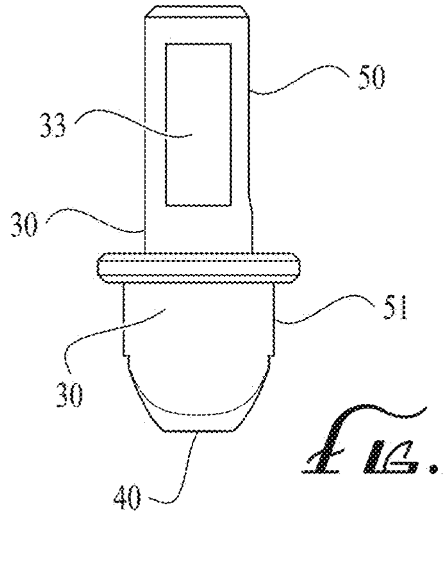
FIG. 8 is a side view of the lower hinge pin used in the door hinge system of FIG. 1 and illustrated in FIG. 6.

The present invention will now be described more fully hereinafter with reference to the accompanying drawings, in which preferred embodiments of the invention are shown. The invention may, however, may be embodied in many different forms and should not be construed as being limited to the embodiments set forth herein. Rather these embodiments are provided so that this disclosure will be thorough and complete, and will fully convey the scope of the invention to those skilled in the art. Like numbers refer to like elements throughout.

With reference to FIGS. 1-5, the door hinge system 10 of the present invention is self-centering or self-closing and includes angular door to doorjamb or ground alignment features, as well as features that simplify door installation and thereby the labor costs of installing a glass door.

The door hinge system 10 of the present invention includes an upper hinge assembly 12 a lower hinge assembly 14 and a door panel 16, connected thereto. The upper and lower hinges assemblies 12 and 14 having a pivot axis 32. In the exemplary embodiment, the door panel 16 is made of glass and features polished peripheral edges. The door panel 16 features upper and lower chamfers 18 and 20, which, in conjunction with the upper and lower hinge assemblies 12 and 14, provide for improved aesthetics of the door panel. Although in the exemplary embodiment, the door panel 16 is a glass panel, door panels made from other materials such as wood, metal and plastic are also suitable. The upper and lower hinges assemblies 12 and 14 may include optional, covers 110, 112, 114 and 116, for protective and aesthetic purposes.

The lower hinge assembly 14 is a gravity style hinge that provides for self-centering or self-closing action of the door panel 16. The lower hinge assembly 14 includes a lower fixed hinge bracket 22 that mounts to a doorjamb or other support structure, a lower movable hinge bracket 24 that interfaces with the door panel 16 and a clamp plate 26 that secures the door panel 16 via gaskets 27 to an inner face of the lower movable hinge bracket 24. The lower fixed hinge bracket 22 and lower movable hinge bracket 24 are interconnected by means of a lower pivot pin 30.

With reference to FIGS. 1-5 and with particular reference to FIGS. 6-8 and 13, the lower pivot pin 30 is mounted coincident with the pivot axis 32 of the door hinge system 10 in the lower movable hinge bracket 24. The lower pivot pin 30 includes an upper pin portion 50 and a lower pin portion 51. The upper pin portion 50 includes a longitudinal slot 44 and set screw flats 33. The longitudinal slot 44 is formed on an outer cylindrical surface of the pivot pin 30, parallel to the pivot axis 32 of the lower pivot pin 30. Set screws 31 which reside in threaded holes in the lower movable hinge bracket 24 bear against the set screw flats 33 to secure the lower pivot pin 30 in the lower movable hinge bracket 24.

The lower pin portion 51 includes a generally u-shaped socket 34 at a lower end. The u-shaped socket 34 interfaces with an engagement pin 36 mounted horizontally in the lower fixed hinge bracket 22. When the engagement pin 36 is centered in the u-shaped socket 34, the lower movable hinge bracket 24 is in an at-rest or zero degree position, which corresponds to the door panel 16 connected thereto being in a closed position. (See FIG. 13.) A set screw 37 secures the engagement pin 36 within the lower fixed hinge bracket 22.

Figure 16:
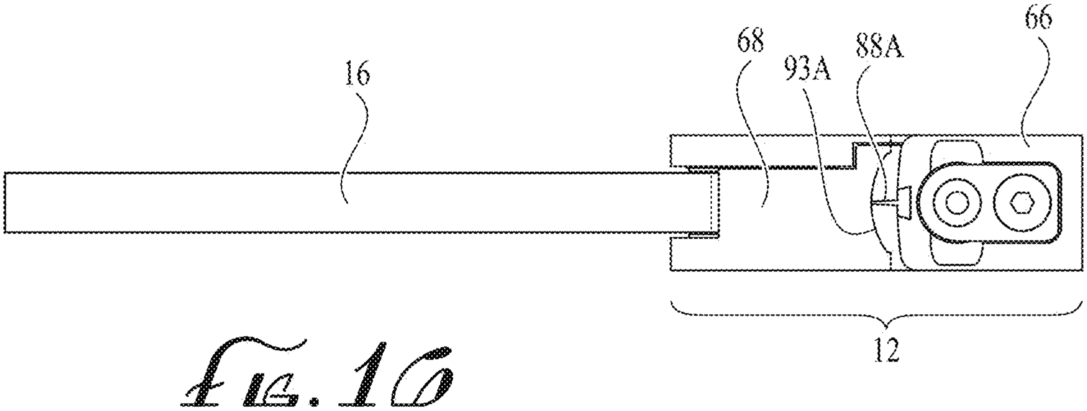
FIG. 16 is top view of the door hinge system of FIG. 1 showing the hinges and door panel in a closed position.
Figure 17:
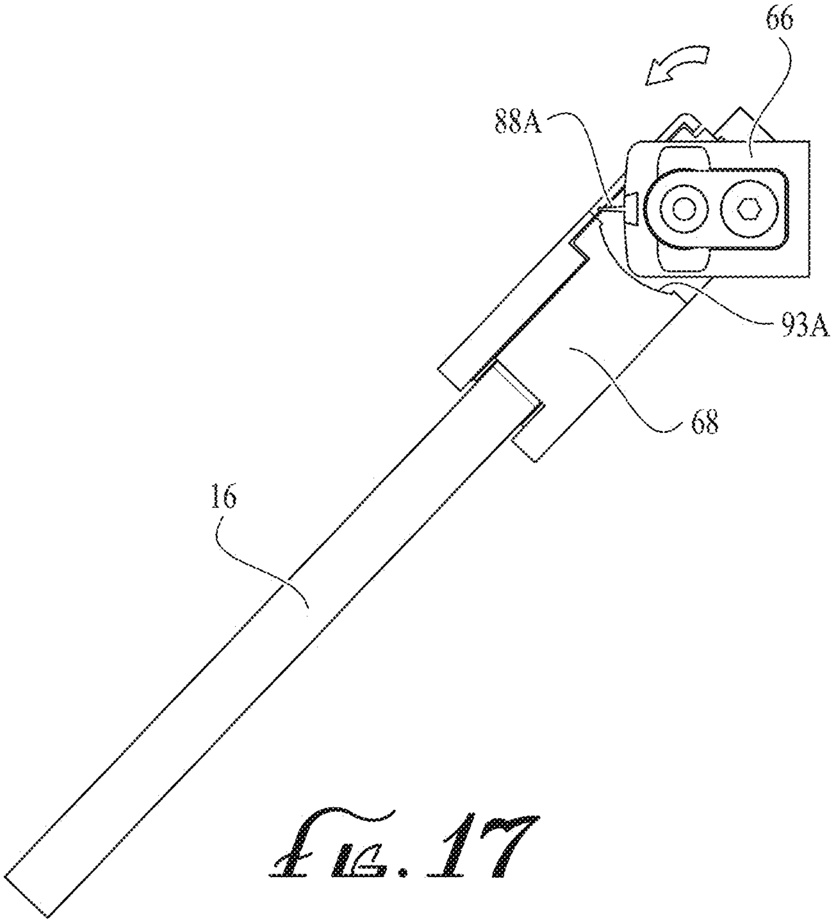
FIG. 17 is top view of the door hinge system of FIG. 1 showing the hinges and door panel rotated clockwise.
Figure 18:
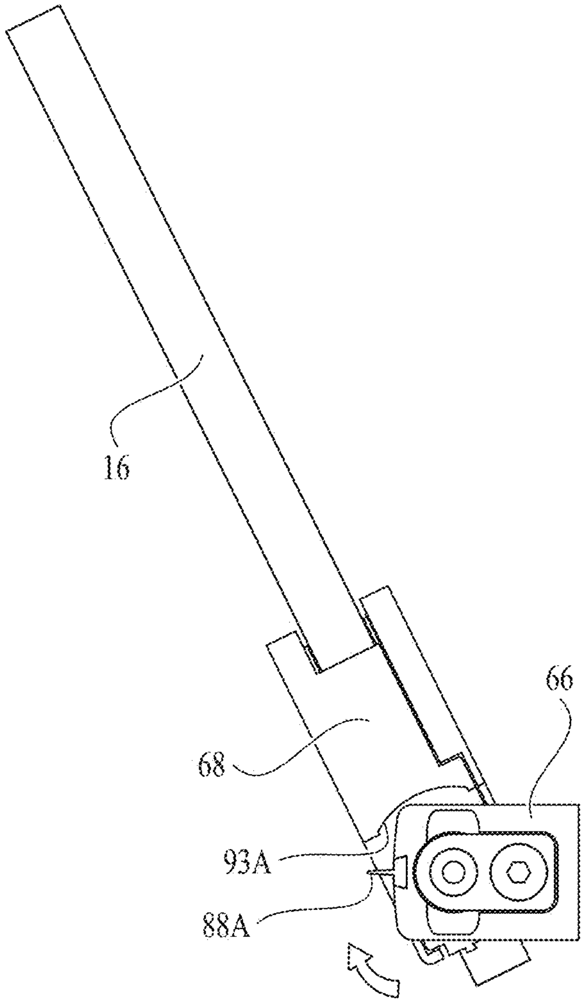
FIG. 18 is top view of the door hinge system of FIG. 1 showing the hinges and door panel rotated counterclockwise.
Figure 19:
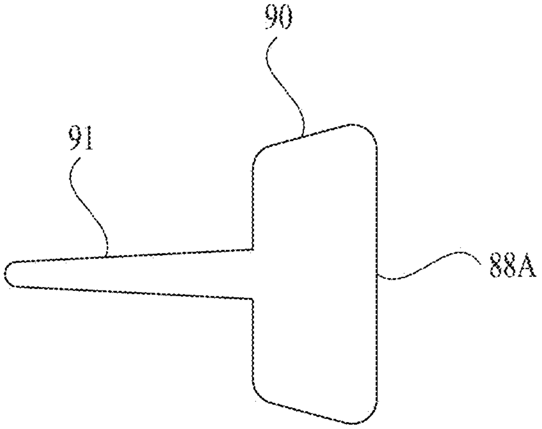
FIG. 19 is a top view of showing the top profile of the water seal suitable for use with the door hinges of the door hinge system of FIG. 1.

The u-shaped socket 34 of the lower pivot pin 30 allows the lower movable bracket 24 and consequently the door panel 16 connected thereto to rotate to either side of the at-rest position, i.e. clockwise or counterclockwise (see FIGS. 16-18). When the door hinge system 10 is installed in an enclosure, such as a shower enclosure, the at-rest position corresponds to the door panel 16 being closed. The door panel 16 has the ability to rotate about 180 degrees inwardly, i.e. into the shower enclosure, and about 180 degrees outwardly, i.e. exterior of the shower enclosure. Further rotation of the door panel 16 beyond 180 degrees inwardly or outwardly from a closed position is blocked by the lower movable hinge bracket 24 contacting the lower fixed hinge bracket 22.

With reference to FIGS. 7-8 and 13-14, the u-shaped socket 34 of the lower pivot pin 30 is configured with self-centering ramps 38 and stationary surfaces 40. At approximately 75 degrees of rotation, either inwardly or outwardly, when released, the door panel 16 will automatically close or self-center as the weight of the door panel 16 and the upper and lower movable hinge brackets 68 and 24 causes the self-centering ramps 38 of the u-shaped socket 34 of the pivot pin 30 to ride downwardly over the engagement pin 36 until the engagement pin 36 is centered in the u-shaped socket 34, which corresponds to zero degrees of rotation or the at-rest or closed position of the door panel. At approximately 75 to 180 degrees of rotation, either clockwise or counterclockwise, the door panel 16 will remain stationary when released, as the stationary surfaces 40 of the u-shaped socket 34 now rest upon the engagement pin 36. (See FIG. 14.)

Figure 9:
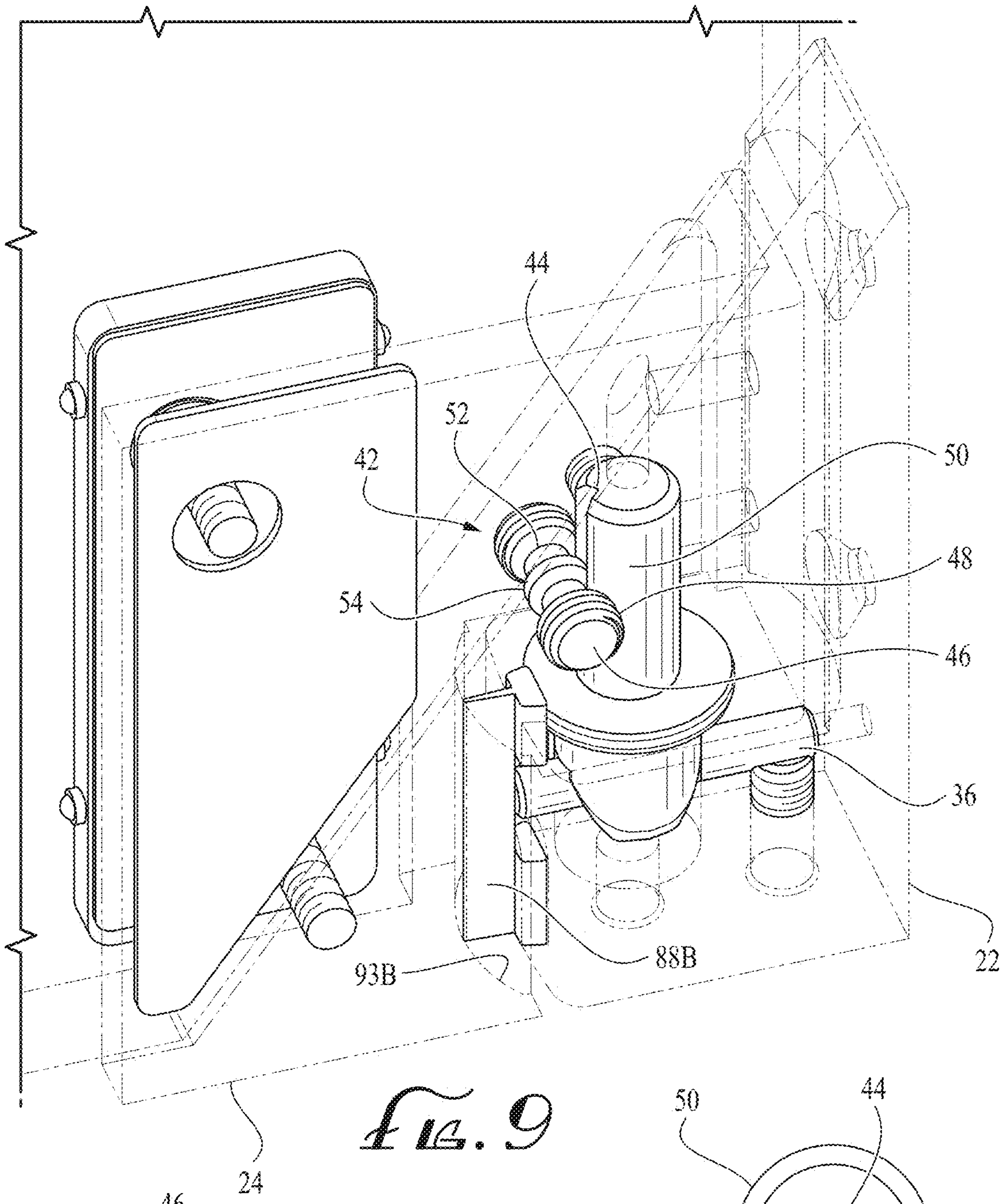
FIG. 9 is a left facing perspective view of the lower hinge of the door hinge system of FIG. 1, with the hinge brackets shown in phantom line to illustrate the internal components of the lower hinge.
Figure 10B:
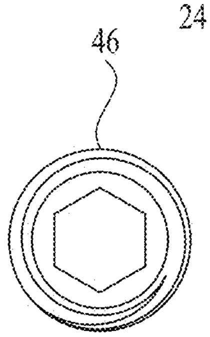
FIG. 10B is a side view of a positioner shown in FIG. 10A.
Figure 10A:
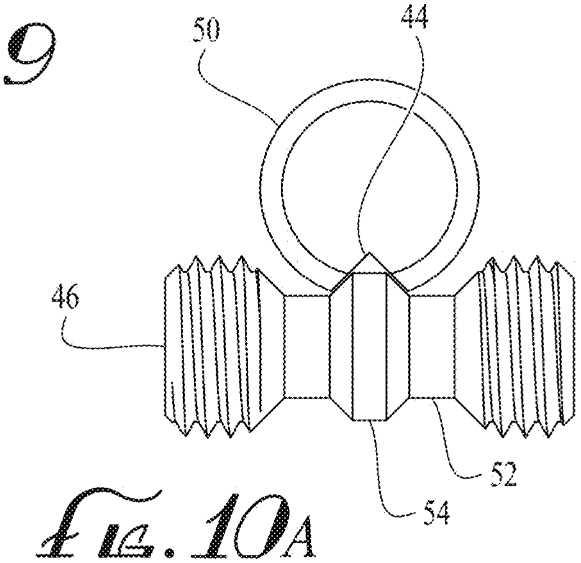
FIG. 10A is a front view of a positioner used in the lower hinge of the door hinge system of FIG. 1.
Figure 11:
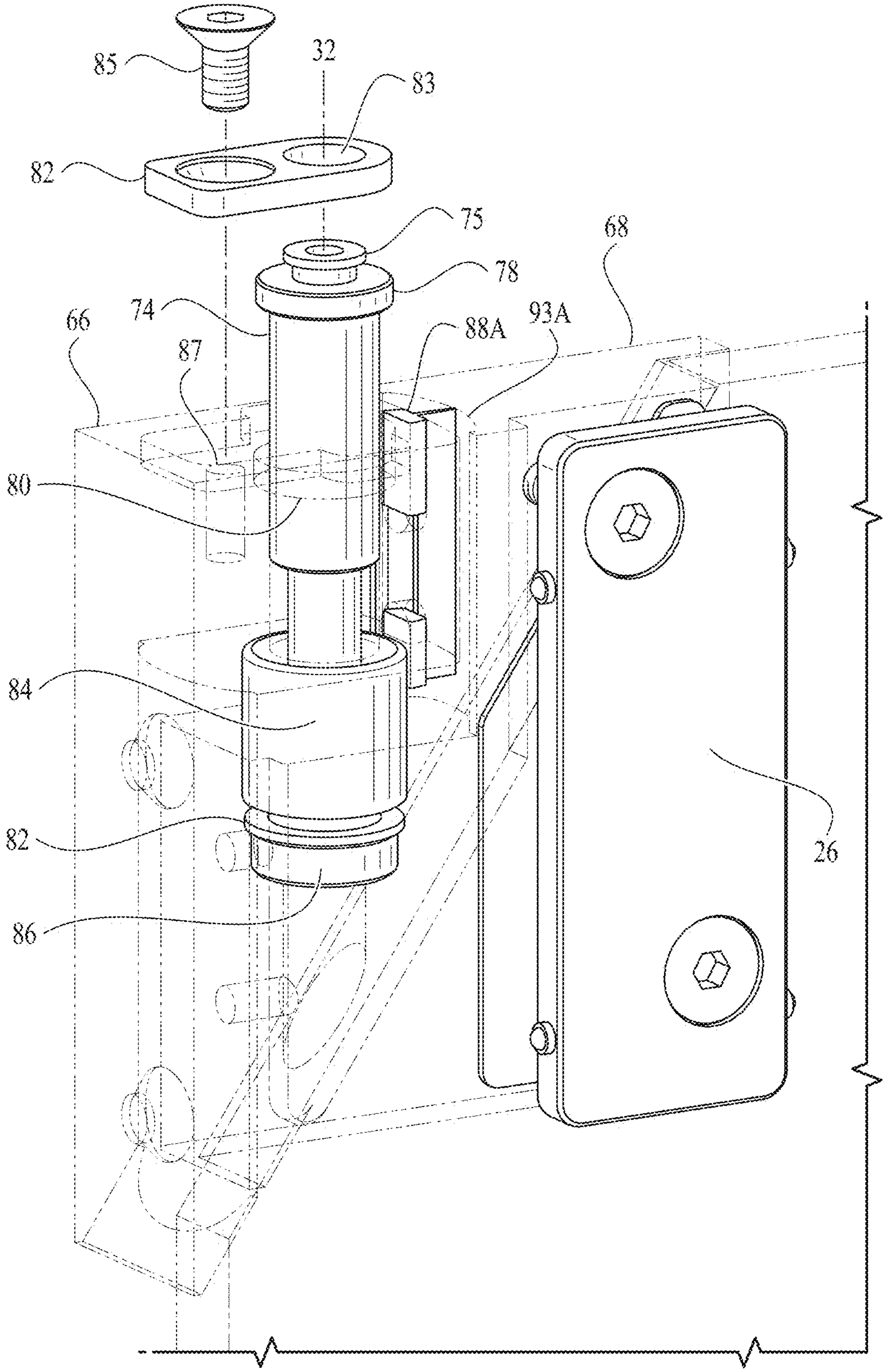
FIG. 11 is a right facing perspective view of the upper hinge of the door hinge system of FIG. 1, with the hinge brackets shown in phantom line to illustrate the internal components of the upper hinge and the hinge pin partially removed for clarity.
Figure 12:
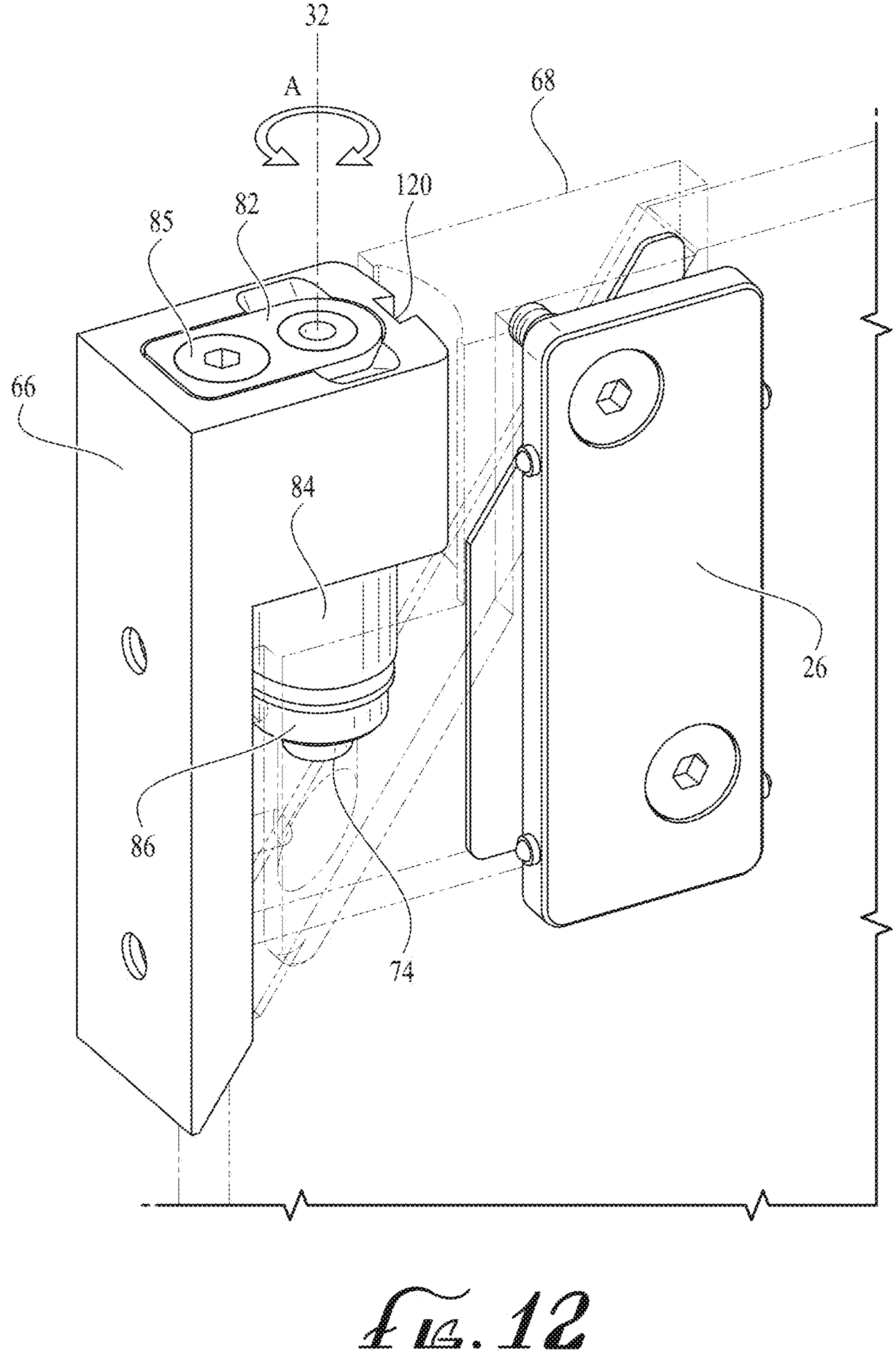
FIG. 12 is a partial, perspective view of the upper hinge of the door hinge system of FIG. 1, with the hinge brackets shown in dashed line to illustrate the internal components of the upper hinge of the upper hinge and the hinge pin partially removed for clarity.
Figure 13:
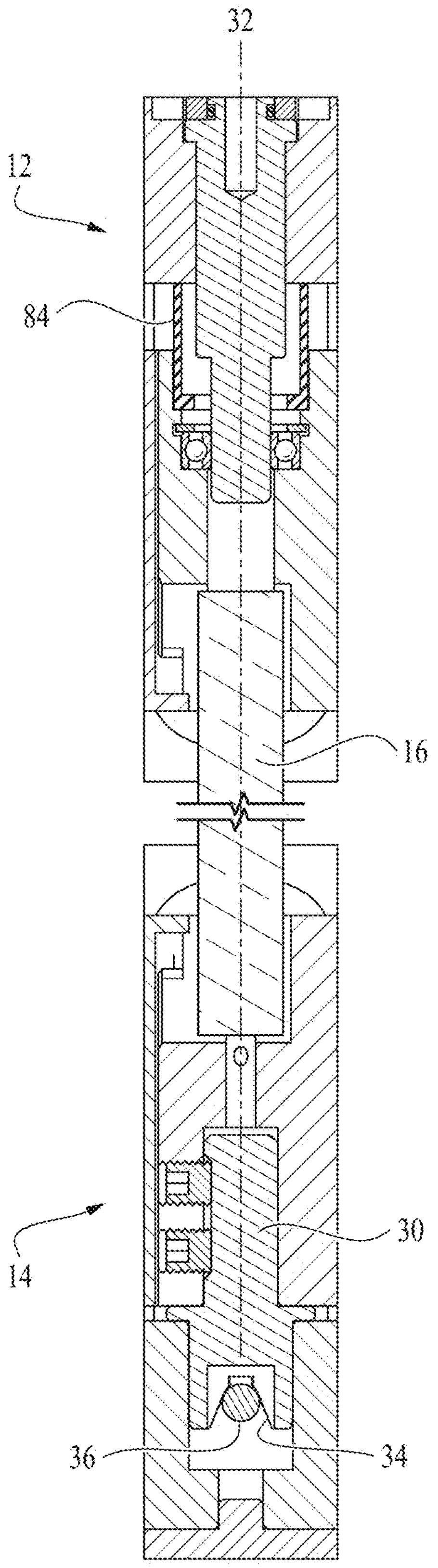
FIG. 13 is a cross-sectional view of the upper and lower hinges showing the position of the internal components in the door-closed position.
Figure 14:
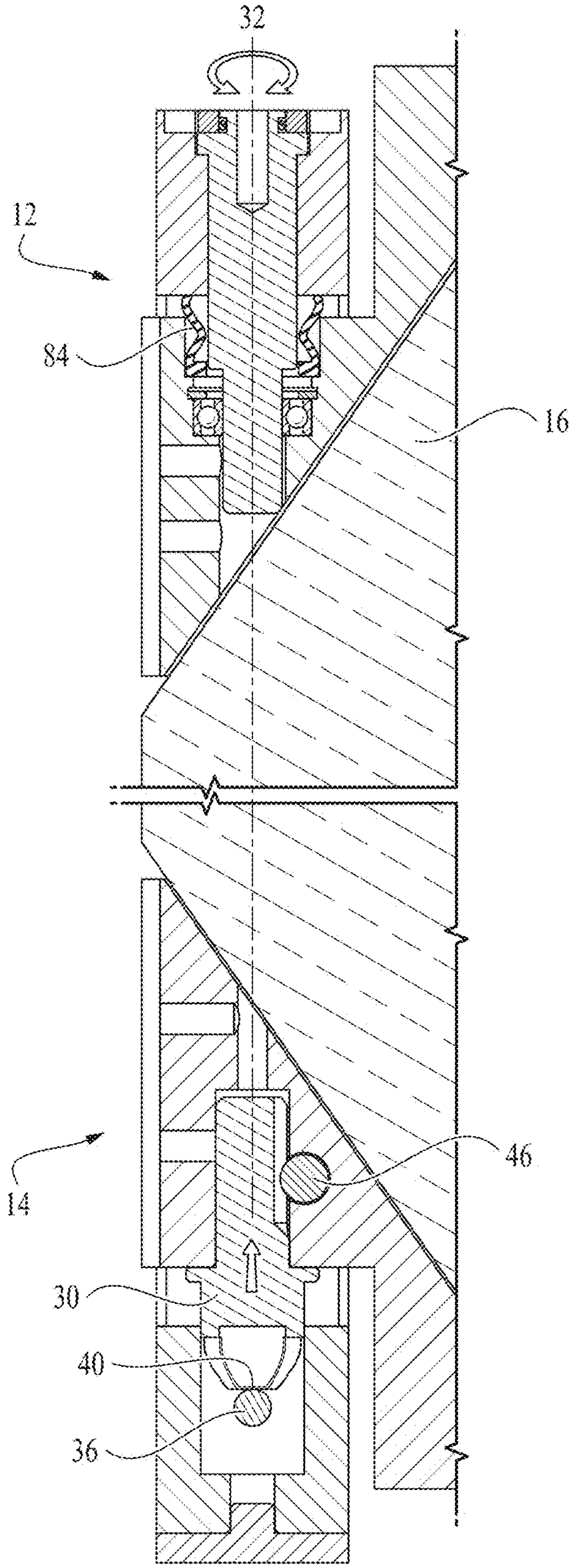
FIG. 14 is a cross-sectional view of the upper and lower hinges showing the position of the internal components in the door-fully-open position.

With reference to FIGS. 1-8 and with particular reference to FIG. 9, to account for angular misalignment between the door panel 16 and a sill or post, in a plane parallel to the floor, the lower hinge assembly 14 includes a first angular alignment feature 42, disposed within the lower movable hinge bracket 24. The first angular alignment feature 42 comprises a longitudinal slot 44 formed along the outer cylindrical surface of the upper pin portion 50 of the lower pivot pin 30 and a horizontally disposed positioner 46, located in the lower movable hinge bracket 24. The positioner 46 includes a shaft 52 having and a centrally located disk 54 which engages with the longitudinal slot 44 of the lower pivot pin 30. The positioner 46 is threaded at one end and engages with a threaded hole 48 (see FIG. 2) of the lower movable hinge bracket 24.

The position of the centrally located disk 54 may be adjusted laterally, i.e. inwardly or outwardly from a center position within the lower movable hinge bracket 24 by rotating the positioner 46 either clockwise or counterclockwise. Lateral movement of the positioner 46 causes the centrally located disk 54 to rotate the lower pivot pin 30 and consequently the u-shaped socket 34 formed integrally therewith about the pivot axis 32 and thereby allows the door panel 16 to be angularly aligned with a sill or post in a plane parallel to the floor.

Figure 15:
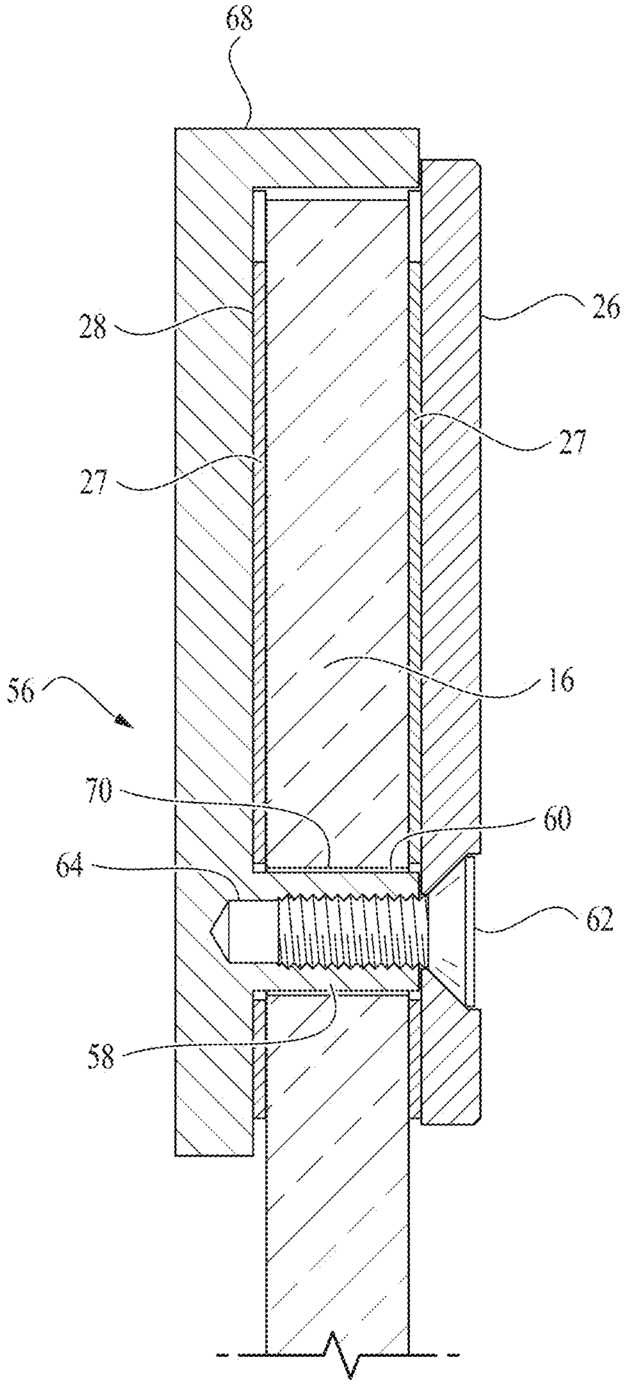
FIG. 15 is a cross-sectional view taken along the line 20-20 of FIG. 1 showing a door panel alignment feature of the hinge system of the present invention.

With reference to FIGS. 1 and 15, to account for small amounts of angular misalignment between the horizontal edges 17 of the door panel 16 with respect to a sill, header, or floor, i.e. in a plane perpendicular to the ground, the upper hinge assembly 12 and the lower hinge assembly 14 include a second angular alignment feature 56. The second angular alignment feature 56 comprises a clearance-hole 60 in the door panel 16 into through which is disposed an internally threaded boss 58. An outside diameter of the boss 58 is configured to be a slip fit with an internal diameter of the clearance-hole 60. The clearance between the boss 58 and the clearance-hole 60 provides for the ability to angularly align the door panel 16 in a plane perpendicular to a floor or sill or a post, by rotating the door panel 16 with respect to the floor, sill or post. Disposed on each side of the door panel 16 are gaskets 27 which engage with interior faces 28 of upper and lower movable hinge brackets 68 and 24, and respective clamp plates 26. The gaskets 27 are made of a deformable material and hold the door panel 16 in place via friction when the door panel 16 is fixed into position by tightening a clamp screw 62 which engages with a threaded hole in the boss 58.

With reference to FIGS. 1, 3, 5 and 11-12, the upper hinge assembly 12 of the door hinge system 10 of the present invention includes the upper fixed hinge bracket 66 that mounts to a doorjamb or other door support structure, an upper movable hinge bracket 68 that interfaces with the door panel 16 and a clamp plate 26 that secures the door panel 16 to the upper movable hinge bracket 68. The upper fixed hinge bracket 66 and upper movable hinge 68 bracket are interconnected by means of an upper pivot pin 74.

The upper fixed hinge bracket 66 is configured to receive the upper pivot pin 74. The upper pivot pin 74 is disposed in a bore 76 in the upper fixed hinge bracket 66 and is located or indexes in the bore by means of a shoulder 78 formed at an upper end of the upper pivot pin 74 which rests upon a radial stop surface or pocket 80 in the upper fixed hinge bracket 66. A retainer 82 retains the upper pivot pin 74 within the bore 76 of the upper fixed hinge bracket 66 by means of a boss 75 which engages with a hole 83 in the retainer 82. The retainer 82 is secured to the upper fixed hinge bracket 66 by means of a screw 85 which engages with a threaded hole 87 in the upper fixed hinge backet 66. A lower end 77 of the upper pivot pin 74 interfaces with a bearing assembly 86 disposed in a bore 89 formed in the upper movable hinge bracket 68. A bearing spacer 81 locates the bearing assembly 86 in the upper movable hinge bracket 68.

With reference to FIGS. 2-6, 9, 11 and 14-19, the upper fixed hinge bracket 66 features a water seal 88A and the lower fixed hinge bracket 22 features a water seal 88B. The water seals 88A and 88B are retained in the upper and lower fixed hinge brackets 66 and 22 by means of dovetail grooves 120 formed in each of the upper and lower fixed hinge brackets, (see FIGS. 2 and 3) which engage with dovetails 90 formed in the water seals 88A and 88B. Each of the water seals 88A and 88B includes a scraper blade 91. The scraper blade 91 of the upper water seal 88A, installed on the upper fixed hinge bracket 66, engages which with a curved surface on 93A of the upper movable hinge bracket 68. (See FIG. 3.) Similarly, the scraper blade 91 of the lower water seal 88B, installed on the lower fixed hinge bracket 22 (see FIG. 2), engages which with a curved surface on 93B of the lower movable hinge bracket 24 (best shown in FIG. 9). The water seals 88A and 88B function to prevent water ingress or egress from between the fixed and movable hinges brackets, i.e. to prevent water from exiting a shower enclosure from between the fixed and movable hinge brackets of the upper and lower hinges.

With reference to FIGS. 3, 5 and 11-12, a hollow cylindrical water seal 84 serves to enclose a portion of the upper pivot pin 74 and prevent water intrusion into the bearing assembly 86 which supports a lower end of the pivot pin.

The door hinge system 10 of the present invention also includes adapter plates that allow door panels fitted with the hinge system of the present invention to be connected to walls, typically glass walls, at a 90 degree angle and further allow door panels to be connected back to back at 180 degree angles.

Figure 20:
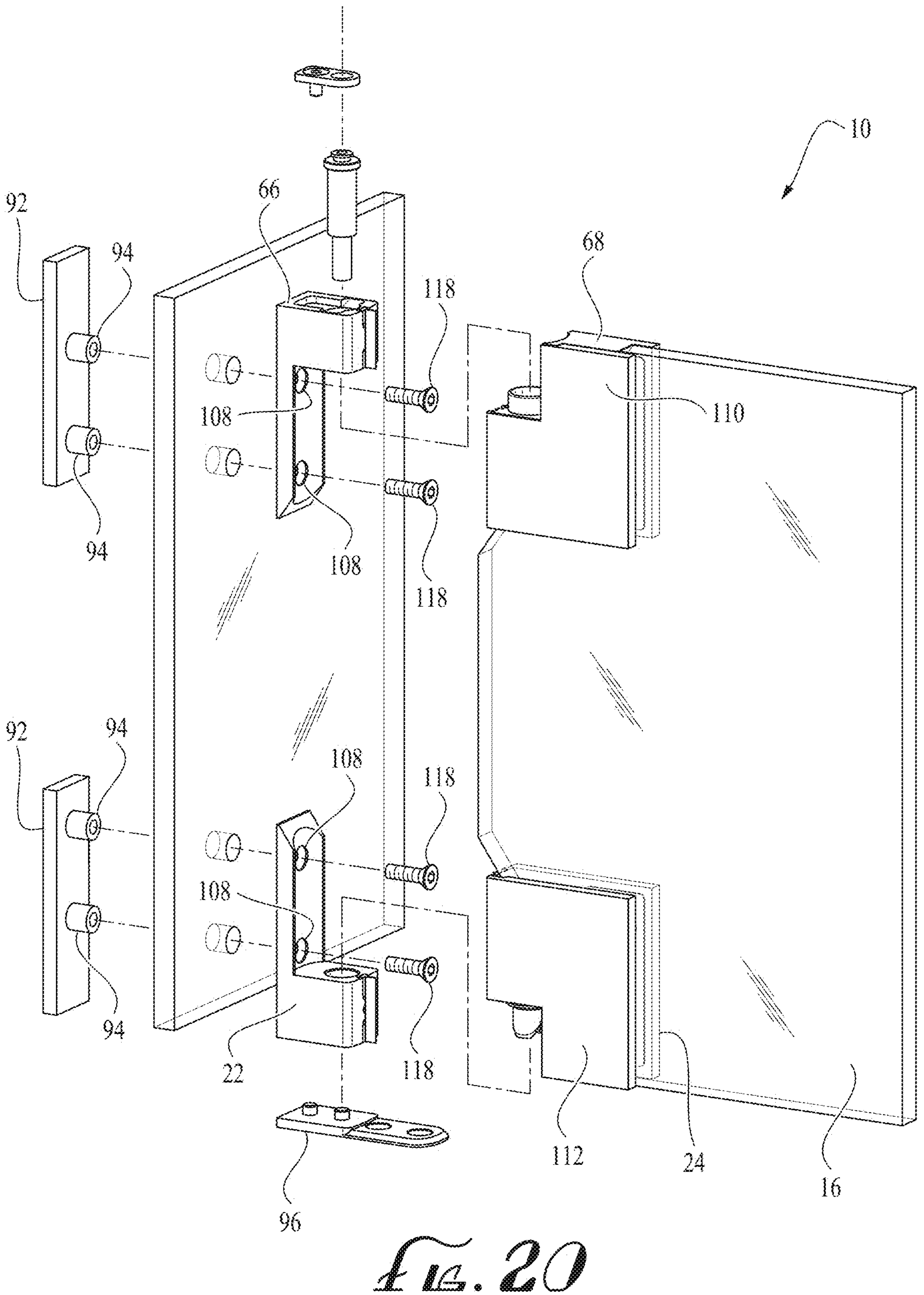
FIG. 20 is an exploded, perspective view showing adapter plates for mounting a door panel equipped with the hinge system of the present invention to a wall panel at a 90 degree angle.
Figure 21:
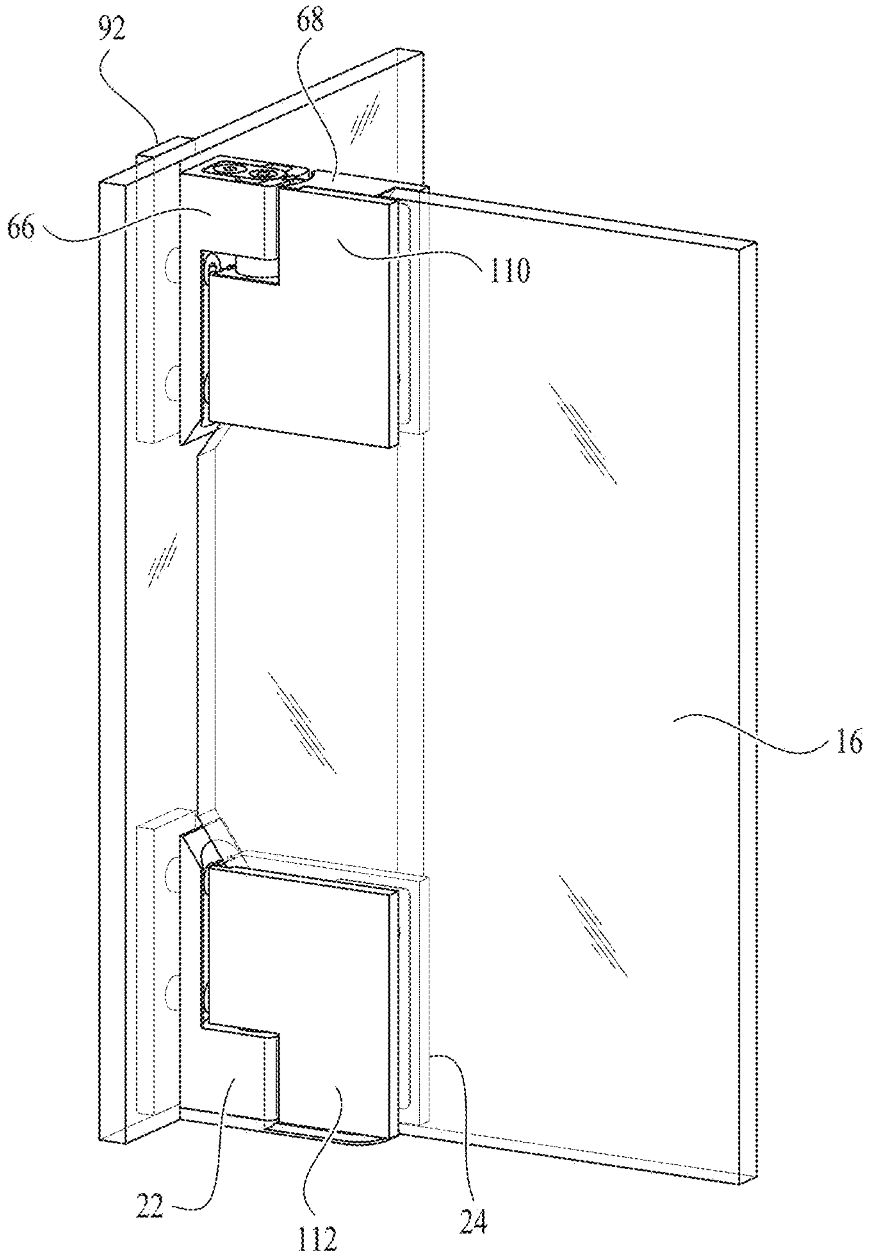
FIG. 21 is a perspective view showing a door panel equipped with the hinge system of the present invention attached to a wall panel at a 90 degree angle with the adapter plates of FIG. 19.

With reference to FIGS. 20-21, an adapter plate 92 for connecting the hinges of the door hinge system 10 of the present invention to a wall panel at a 90 degree angle are shown. Each adapter plate 92 includes a pair of bosses 94 which are spaced to match with holes 108 in the upper and lower fixed hinge brackets 66 and 22 of the door hinge system 10 of the present invention. The bosses 94 include internal threads so that the upper and lower fixed hinge brackets 66 and 22 of may be attached to the adapter plates 92 by means of screws 118. A bottom plate 96 may, optionally, also be used to prevent the lower movable hinge bracket 24 from rotating relative to the lower fixed hinge bracket 22, which has the effect of preventing the door panel 16 from swinging. The bottom plate 96 is configured to attach to a bottom surface of the lower fixed hinge bracket 22 and the lower movable hinge bracket 24, via screws or other mechanical fasteners.

Figure 22:
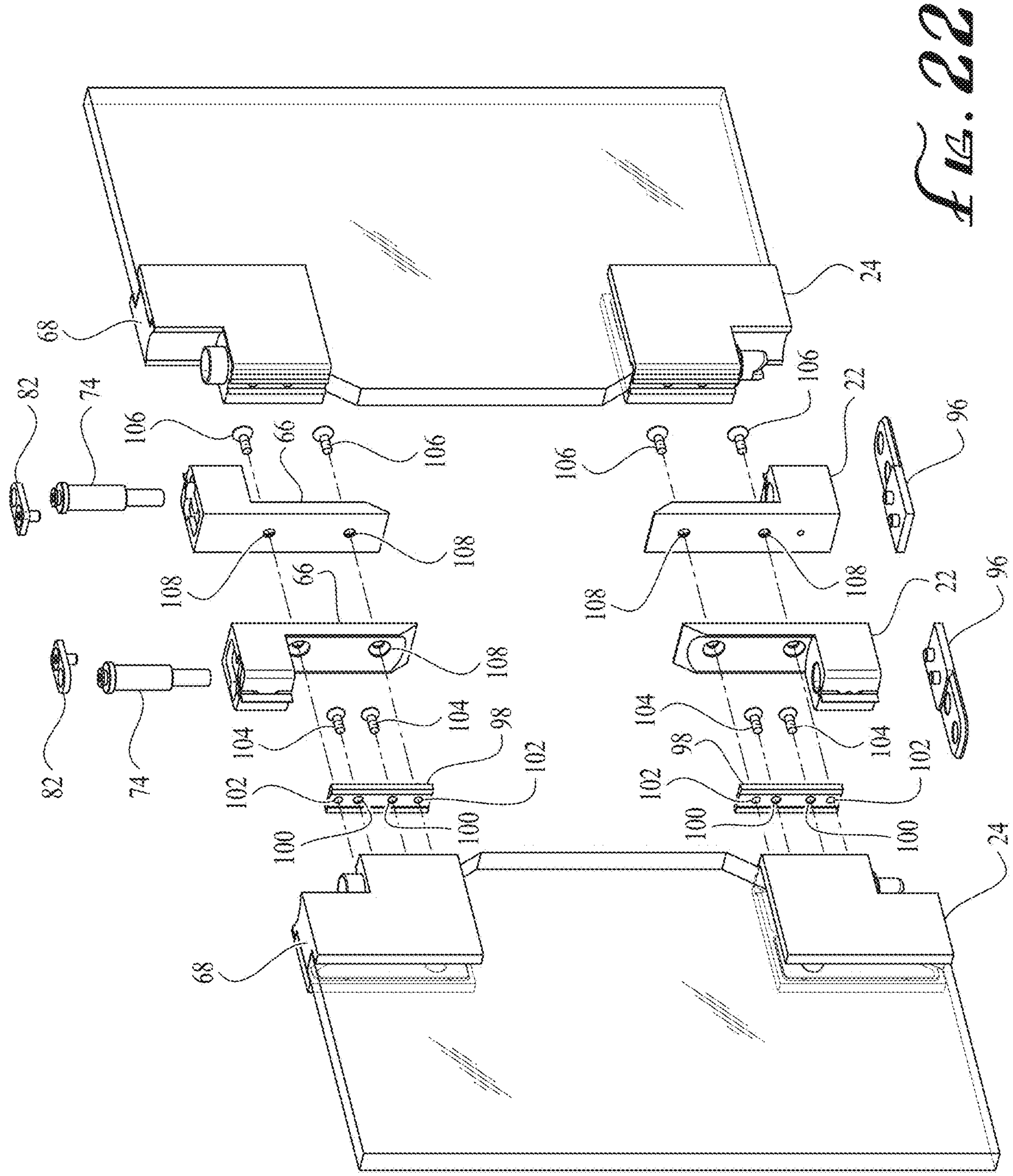
FIG. 22 is a perspective view showing two door panels equipped with the hinge system of the present invention attached to each other at a 180 degree angle using adapter plates in accordance with the present invention.

With reference to FIG. 22, adapter plates 98 for interconnecting two doors, i.e. a first door and a second door, fitted with the door hinge system 10 of the present invention at a 180 degree angle are shown. Each adapter plate 98 includes a pair of clearance holes 100 and a pair of threaded holes 102. The clearance holes 100 of each adapter plate 98 serve to attach the adapter plates 98 to the upper movable hinge bracket 68 and the lower movable hinge bracket 24 of the first door, via screws 104.

The upper and lower fixed hinge brackets 66 and 22 of the second door are connected in a back-to-back relationship to the upper and lower fixed hinge brackets 66 and 22 of the first door via screws 106, which pass through the holes 108 of the upper and lower fixed hinge brackets 66 and 22 of both doors and engage the threaded holes 102 of the adapter plates 98. The second door may then be attached to via its respective upper and lower movable hinge brackets 68 and 24 by positioning the upper and lower movable hinge brackets 68 and 24 into place on the upper and lower fixed hinge brackets 66 and 22 and inserting the upper pivot pin 74 through the upper fixed hinge bracket 66 and into the upper movable hinge bracket 68. In this manner, multiple door panels equipped with the hinge system of the present invention may be interconnected to form a stationary wall.

While the present invention has been described with regards to particular embodiments, it is recognized that additional variations of the present invention may be devised without departing from the inventive concept.

The invention claimed is:

1. A door hinge for use with a door panel, comprising:

a fixed bracket and a movable bracket, interconnected by a pivot pin;

wherein the pivot pin is removably insertable into a bore in the fixed bracket;

the pivot pin including a shoulder and the bore including a stop surface, wherein the shoulder of the pivot pin indexes with the stop surface, the pivot pin further including a pivot pin boss;

wherein a retainer interfaces with the pivot pin and the fixed bracket to secure the pivot pin in the bore, the retainer including a first hole for engaging the pivot pin boss, and a second hole, the retainer is secured to the fixed bracket by a threaded fastener which extends through the second hole and engages a threaded hole in the fixed bracket, such that the shoulder is axially fixed between the stop surface and the retainer;

wherein the movable bracket includes a bearing which engages with the pivot pin; and means for fixing a door panel to the movable bracket.

2. The door hinge of claim 1, wherein the means for fixing a door panel to the movable bracket comprises a clamp plate that clamps the door panel to a surface of the movable bracket.

3. The door hinge of claim 2, further including an adjusting means for angularly adjusting the door panel in a plane perpendicular to a ground plane, the adjusting means comprising a hole in the door panel and a boss formed on the movable hinge bracket, the boss disposed within the hole, wherein the boss is configured to be in a slip fit relationship with the hole such that the door panel is rotatable about the boss.

4. The door hinge of claim 3, wherein the clamp plate and boss are configured such that the clamp plate is removably attachable to the boss.

5. The door hinge of claim 1, wherein the fixed bracket includes a water seal which engages with the movable bracket and prevents water passage between the fixed and movable brackets.

* * * * *